United States Patent
Soe et al.

(10) Patent No.: US 7,266,352 B2
(45) Date of Patent: Sep. 4, 2007

(54) MULTIPLE BAND RF TRANSMITTERS AND RECEIVERS HAVING INDEPENDENTLY VARIABLE RF AND IF LOCAL OSCILLATORS AND INDEPENDENT HIGH-SIDE AND LOW-SIDE RF LOCAL OSCILLATORS

(75) Inventors: Zaw Min Soe, Encinitas, CA (US); Tony Yang, Whitford, CA (US); Jackie Cheng, Irvine, CA (US); Sining Zhou, Irvine, CA (US); Kuangyu Li, Glendale, CA (US); Fei-Ran Yang, Diamond Bar, CA (US); Shoufang Chen, Irvine, CA (US); Tom Baker, Los Angeles, CA (US)

(73) Assignee: Wionics Research, Irvine, CA (US)

( * ) Notice: Subject to any disclaimer, the term of this patent is extended or adjusted under 35 U.S.C. 154(b) by 519 days.

(21) Appl. No.: 10/856,125

(22) Filed: May 28, 2004

(65) Prior Publication Data

US 2005/0266806 A1 Dec. 1, 2005

(51) Int. Cl.
*H04B 1/16* (2006.01)

(52) U.S. Cl. .................. 455/209; 455/189.1; 455/315; 455/318

(58) Field of Classification Search ............ 455/183.1, 455/183.2, 209, 187.1, 196.1, 77, 102, 168.1, 455/189.1, 315, 316, 318, 41.2, 73
See application file for complete search history.

(56) References Cited

U.S. PATENT DOCUMENTS 6,066,989 A * 5/2000 Knecht et al. ................ 331/18
6,310,863 B1 10/2001 Yamamoto (Continued)

OTHER PUBLICATIONS

A Direct-Conversion CMOS Transceiver for 4.9-5.95GH$_z$ Multi-Standard WLANS, T. Maeda, et al., 2004 IEEE International Solid-State Circuits Conference, session 5, WLAN Transceivers, p. 62.
A Single Chip CMOS Transceiver for 802.11a/b/g WLANS, R. Ahola, et al., 2004 IEEE International Solid-State Circuits Conference, session 5, WLAN Transceivers, p. 64.

(Continued)

*Primary Examiner*—Edward F. Urban
*Assistant Examiner*—Christian Hannon
(74) *Attorney, Agent, or Firm*—Foley & Lardner LLP

(57) ABSTRACT

Multistage RF transmitter and receiver circuits may use independently variable RF and IF local oscillators, allowing the RF and IF local oscillator frequencies for a given RF channel to be selected to have a large common factor with respect to the reference oscillator used by the local oscillator circuits, thus allowing the use of small divisor numbers in the local oscillator circuits and reducing phase noise. Independent high-side and low-side RF local oscillators may be provided and selectively used depending on the RF channel to be transmitted or received.

21 Claims, 6 Drawing Sheets

U.S. PATENT DOCUMENTS

| | | | |
|---|---|---|---|
| 6,570,948 B1* | 5/2003 | Marshall | 375/376 |
| 6,690,949 B1* | 2/2004 | Shamlou et al. | 455/557 |
| 6,826,388 B1* | 11/2004 | Tanaka et al. | 455/77 |
| 7,149,246 B1* | 12/2006 | Adams et al. | 375/238 |
| 2002/0164961 A1* | 11/2002 | Atkinson et al. | 455/86 |
| 2003/0207668 A1* | 11/2003 | McFarland et al. | 455/3.01 |
| 2004/0087298 A1* | 5/2004 | Yamawaki et al. | 455/313 |
| 2004/0204036 A1* | 10/2004 | Yang | 455/553.1 |
| 2005/0003773 A1* | 1/2005 | Cowley et al. | 455/150.1 |
| 2005/0014466 A1* | 1/2005 | Park et al. | 455/20 |

OTHER PUBLICATIONS

A Single Chip Dual-Band Tri-Mode CMOS Transceiver for IEEE 802.11 a/b/g WLAN, M. Zargari, et al., 2004 IEEE International Solid-State Circuits Conference, session 5, WLAN Transceivers, p. 68-69.

PCT International Search Report from related PCT application No. PCT/US05/18344 dated Jun. 13, 2006.

* cited by examiner

802.11b/g Frequency Configurations

| | RF LO | | | | IF LO | | | |
|---|---|---|---|---|---|---|---|---|
| RF | $M_1$ | $N_1$ | VCO $f$ | RF LO $f$ | $M_2$ | $N_2$ | VCO $f$ | IF LO $f$ |
| 2412 | 2 | 159 | 6360 | 3180 | 10 | 768 | 3072 | 768 |
| 2417 | 2 | 159 | 6360 | 3180 | 10 | 763 | 3052 | 763 |
| 2422 | 2 | 160 | 6400 | 3200 | 10 | 778 | 3112 | 778 |
| 2427 | 2 | 160 | 6400 | 3200 | 10 | 773 | 3092 | 773 |
| 2432 | 2 | 160 | 6400 | 3200 | 10 | 768 | 3072 | 768 |
| 2437 | 2 | 160 | 6400 | 3200 | 10 | 763 | 3052 | 763 |
| 2442 | 2 | 161 | 6440 | 3200 | 10 | 778 | 3112 | 778 |
| 2447 | 2 | 161 | 6440 | 3220 | 10 | 773 | 3092 | 773 |
| 2452 | 2 | 161 | 6440 | 3220 | 10 | 768 | 3072 | 768 |
| 2457 | 2 | 161 | 6440 | 3220 | 10 | 763 | 3052 | 763 |
| 2462 | 2 | 162 | 6480 | 3240 | 10 | 778 | 3112 | 778 |
| 2467 | 2 | 162 | 6480 | 3240 | 10 | 773 | 3092 | 773 |
| 2472 | 2 | 162 | 6480 | 3240 | 10 | 768 | 3072 | 768 |
| 2477 | 2 | 162 | 6480 | 3240 | 10 | 763 | 3052 | 763 |
| 2484 | 2 | 163 | 6520 | 3260 | 10 | 776 | 3104 | 776 |

802.11j Frequency Configurations

| | RF LO | | | | IF LO | | | |
|---|---|---|---|---|---|---|---|---|
| RF | $M_1$ | $N_1$ | VCO $f$ | RF LO $f$ | $M_2$ | $N_2$ | VCO $f$ | IF LO $f$ |
| 4920 | 2 | 208 | 4160 | 4160 | 2 | 152 | 3040 | 760 |
| 4940 | 2 | 209 | 4180 | 4180 | 2 | 152 | 3040 | 760 |
| 4960 | 2 | 210 | 4200 | 4200 | 2 | 152 | 3040 | 760 |
| 4980 | 2 | 211 | 4220 | 4220 | 2 | 152 | 3040 | 760 |
| 5040 | 2 | 214 | 4280 | 4280 | 2 | 152 | 3040 | 760 |
| 5060 | 2 | 215 | 4300 | 4300 | 2 | 152 | 3040 | 760 |
| 5080 | 2 | 216 | 4320 | 4320 | 2 | 152 | 3040 | 760 |
| 5170 | 2 | 221 | 4420 | 4420 | 2 | 150 | 3000 | 750 |
| 5190 | 2 | 221 | 4420 | 4420 | 2 | 154 | 3080 | 770 |
| 5210 | 2 | 222 | 4440 | 4440 | 2 | 154 | 3080 | 770 |
| 5230 | 2 | 223 | 4460 | 4460 | 2 | 154 | 3080 | 770 |

802.11a Frequency Configurations

| | RF LO | | | | IF LO | | | |
|---|---|---|---|---|---|---|---|---|
| RF | $M_1$ | $N_1$ | VCO $f$ | RF LO $f$ | $M_2$ | $N_2$ | VCO $f$ | IF LO $f$ |
| 5180 | 2 | 221 | 4420 | 4420 | 2 | 152 | 3040 | 760 |
| 5200 | 2 | 222 | 4440 | 4440 | 2 | 152 | 3040 | 760 |
| 5220 | 2 | 223 | 4460 | 4460 | 2 | 152 | 3040 | 760 |
| 5240 | 2 | 224 | 4480 | 4480 | 2 | 152 | 3040 | 760 |
| 5260 | 2 | 225 | 4500 | 4500 | 2 | 152 | 3040 | 760 |
| 5280 | 2 | 226 | 4520 | 4520 | 2 | 152 | 3040 | 760 |
| 5300 | 2 | 227 | 4540 | 4540 | 2 | 152 | 3040 | 760 |
| 5320 | 2 | 228 | 4560 | 4560 | 2 | 152 | 3040 | 760 |
| 5745 | 2 | 326 | 6520 | 6520 | 2 | 155 | 3100 | 775 |
| 5765 | 2 | 326 | 6520 | 6520 | 2 | 151 | 3020 | 755 |
| 5805 | 2 | 328 | 6560 | 6560 | 2 | 155 | 3100 | 775 |
| 5845 | 2 | 328 | 6560 | 6560 | 2 | 151 | 3020 | 755 |

Figure 9

MULTIPLE BAND RF TRANSMITTERS AND RECEIVERS HAVING INDEPENDENTLY VARIABLE RF AND IF LOCAL OSCILLATORS AND INDEPENDENT HIGH-SIDE AND LOW-SIDE RF LOCAL OSCILLATORS

RELATED APPLICATIONS

The following commonly-owned U.S. patent applications are related to the present application: Digitally Programmable I/Q Phase Offset Compensation, filed 28 May 2004, Ser. No. 10/856,075; Current Mode Output Stage Circuit With Open Loop DC Offset Reduction, filed 28 May 2004, Ser. No. 10/856,076; Apparatus and Method for Dynamic DC Offset Detection and Cancellation, filed 5 Mar. 2004, Ser. No. 10/795,076; Charge Pump Circuit Using Active Feedback Controlled Current Sources; filed 5 Mar. 2004, Ser. No. 10/794,189; and Apparatus and Method for Amplifier Transconductance Enhancement, filed 5 Mar. 2004, Ser. No. 60/550,527. It is preferred to use the inventions described in these applications in the embodiments described herein. These applications are incorporated herein by reference for their teachings of the inventions described therein.

BACKGROUND

1. Field of the Invention

Embodiments of the invention relate to radio frequency (RF) transceivers, and particularly to transceiver architectures employing multiple stages for modulation or demodulation of RF signals.

2. Related Technology

Transceiver circuits are used in devices that receive or transmit information using radio frequency modulation. Examples of devices that use transceiver circuits include wireless LAN interfaces, cell phones, personal digital assistants, GPS receivers and other devices having RF communication features.

Transceiver circuit architectures may be categorized by the manner in which they modulate and demodulate signals. FIG. 1 shows an example of a direct conversion receiver circuit that converts an RF signal directly to a baseband signal. In this circuit an RF signal received by an antenna 10 is filtered in a surface acoustic wave (SAW) filter 12 having a band pass profile for selecting a frequency band of interest. The filtered signal is provided to a balun 14 that converts the signal from a single ended signal to a differential signal. The differential signal is provided as input to a low noise amplifier 16 having a programmable gain. The low noise amplifier 16 provides the differential RF signals to respective mixers 18, 20 where they are down-converted to differential in-phase (I) and quadrature (Q) baseband signals by mixing with differential in-phase and quadrature signals generated by an RF local oscillator (LO) 22. The baseband signals are output from the mixers 18, 20 to respective low pass filters 24, 26 and then to baseband amplifiers 28, 30. A direct conversion transmitter circuit is shown in FIG. 2. In the transmitter circuit, differential in-phase and quadrature baseband signals are filtered by respective low pass filters 32, 34 and provided to mixers 36, 38 where they are up-converted to RF by mixing with differential in-phase and quadrature signals generated by an RF local oscillator 40. The outputs of the mixers 36, 38 are summed and provided to a balun 42 where they are converted from differential signals to a single ended signal. The output of the balun 42 is provided to a power amplifier 44 that drives an antenna 10.

The transmitter and receiver architectures of FIGS. 1 and 2 are referred to as direct conversion architectures because a single mixing stage is used to convert signals between RF and baseband. For purposes of channel selection in the receiver, the RF local oscillator frequency is varied so as to down-convert the frequency of the selected channel to baseband. Spurious tones from neighboring channels are eliminated from the baseband signal by the low pass filters 24, 26. Similarly, in the transmitter the RF local oscillator frequency is varied so as to up-convert the baseband signal to the desired RF channel frequency.

The direct conversion method is sometimes preferred for its relatively simple architecture, however it also has a number of drawbacks. For example, in order to provide high accuracy in the mixers, it is necessary for the mixers to receive differential inputs. This requires the use of a balun, which in turn requires the use of multiple inductors that increase the total size of the circuit. Also, because there are few amplifier stages, this architecture also requires the use of very low noise amplifiers, which necessitates large amplifier size and power consumption.

Other drawbacks of direct conversion architectures are specific to the local oscillator circuit. In the direct conversion architecture, the local oscillator circuit must produce exact frequencies for down-converting or up-converting specific RF channels. For example, in wireless LAN devices, a direct conversion local oscillator for the 802.11 b/g standards must produce frequencies that are adjustable in increments of 5 MHz from 2412 MHz to 2477 MHz, and also 2484 MHz. For the 802.11j standard, the local oscillator must produce frequencies that are adjustable in increments of 20 MHz from 4920 MHz to 4980 MHz, from 5040 MHz to 5080 MHz, and from 5170 MHz to 5230 MHz. For the 802.11a standard, the local oscillator must produce frequencies that are adjustable in increments of 20 MHz from 5180 MHz to 5320 MHz, and from 5745 MHz to 5845 MHz. The need for a local oscillator that is adjustable in this manner is a significant restraint on device performance because it requires the use of a local oscillator that generates significant phase noise.

FIG. 3 shows an example of a conventional phase locked loop circuit that is typically used as a local oscillator in circuits such as direct conversion transceivers. The primary frequency generating element of this circuit is a voltage controlled oscillator 50 that produces an output frequency corresponding to a charge stored in a low pass filter 52. The charge in the low pass filter 52 is controlled by a charge pump 54 that drives current into or out of the low pass filter 52 in response to a control signal provided by a phase frequency detector 56. The phase frequency detector 56 produces the control signal based on comparison of the frequency of the voltage controlled oscillator 50 to a reference frequency. The reference frequency is typically generated by dividing the signal from a reference frequency generator 58 such as a crystal oscillator using a frequency divider 60. The signal from the voltage controlled oscillator 50 is also typically divided by a frequency divider 62 so that the frequencies compared by the phase frequency detector 56 are approximately the same. The frequency dividers are a significant source of phase noise in this circuit and the phase noise increases as the divisor number of the frequency divider increases. In the case of the 802.11 a/j and 802.11 b/g standards, very large divisor numbers are required to produce the local oscillator frequencies that are needed for the channels of those standards. Consider an example in which a 40 MHz crystal oscillator is used as a reference frequency generator and the circuit must generate a frequency of 2417 MHz. In order to produce frequencies that can be compared by the phase frequency detector 56, the 40 MHz reference frequency and the 2417 MHz output frequency must each be divided down to a common factor of 1 MHz. This requires the frequency divider 62 that divides the VCO output frequency to utilize a divisor of 2417. This divisor is very large and results in the production of significant phase noise. Divisors of similar magnitudes must be used for the other channels of the 802.11 a/j and 802.11 b/g standards.

In addition to high phase noise, the high frequency local oscillators used in direct conversion architectures typically suffer from high flicker noise, significant skew between in-phase and quadrature signals, and significant DC offsets between the differential baseband signals. The need to produce in-phase and quadrature signals at higher frequencies also requires these local oscillators to utilize on-chip inductors that consume significant area.

An alternative to direct conversion transceiver architectures is the multistage or superheterodyne transceiver architecture. FIG. 4 shows an example of a conventional superheterodyne receiver circuit. In this circuit, a signal is received at an antenna 10 and is filtered by a SAW filter 12. The filtered signal is provided by the SAW filter 12 to a single ended programmable gain low noise amplifier 70. The amplifier 70 provides the RF signal to an RF mixer 72 where it is down-converted to a fixed intermediate frequency (IF) value by mixing with an RF local oscillator signal from an RF local oscillator 74. The intermediate frequency signal is output to a SAW filter 76 having a band select profile corresponding to the predetermined intermediate frequency. The filtered signal is provided to respective IF mixers 78, 80 where it is down-converted to differential in-phase and quadrature baseband signals by mixing with in-phase and quadrature signals from an intermediate frequency local oscillator 82. The differential baseband signals are filtered by low pass filters 84, 86 and amplified by programmable gain baseband amplifiers 88, 90. A corresponding superheterodyne transmitter architecture uses a fixed frequency local oscillator and mixers to up-convert differential in-phase and quadrature baseband signals to a fixed intermediate frequency, and then uses a variable frequency RF local oscillator and RF mixer to up-convert the intermediate frequency signal to an RF signal at the frequency of a selected channel.

During operation, the superheterodyne receiver downconverts the received RF signal to a fixed intermediate frequency and then performs a second down-conversion of the intermediate frequency to baseband. For purposes of channel selection, the RF local oscillator frequency is varied so as to down-convert the frequency of the selected channel to the fixed intermediate frequency, and spurious tones from adjacent channels are removed by the SAW filter 76.

The superheterodyne transceiver architecture has several advantages over the direct conversion architecture. High gain in the front end amplifier 70 and in the RF mixer 72 relaxes the noise requirements for the baseband amplifiers 88, 90 and therefore reduces the size and power requirements of the baseband amplifiers. Also, second order distortion in this circuit is less crucial and so a single ended amplifier topology may be used at the front end, resulting in a lower noise figure for the circuit as a whole. With regard to the local oscillators, the ability to use a single ended topology in the first down-conversion stage eliminates the need for the inductors required by the direct conversion mixer as well as the inductors required for a front-end balun. Also, the generation of in-phase and quadrature signals is much more accurate at intermediate frequencies than at direct conversion frequencies, and so the intermediate frequency local oscillator produces more accurate signals and results in lower DC offsets in the baseband signals.

Despite these advantages, the superheterodyne transceiver architecture also has several drawbacks. The need for a SAW filter 76 between the RF and IF mixing stages is a disadvantage because SAW filters are discrete components that are expensive and relatively large. Further, in order to reduce the introduction of noise from image channels, the RF mixer must be implemented as an image reject mixer, which consumes a relatively large amount of space and power. In addition, the need to down-convert the various channels within the RF band to a fixed intermediate frequency requires the RF local oscillator to be adjustable among values dictated by the channel frequencies and the intermediate frequency, leading to phase noise problems similar to those described in regard to direct conversion architectures.

One alternative to the superheterodyne architecture of FIG. 4 is sometimes referred to as a "sliding IF" architecture. The sliding IF architecture differs from the architecture of FIG. 4 in that the IF local oscillator is provided by dividing the RF local oscillator frequency by a fixed number. This causes the intermediate frequency to vary with changes in the RF local oscillator. While this architecture simplifies the design of the oscillators, it still requires the RF oscillator to switch among frequencies that require the use of large divisor numbers in the frequency synthesizer, and therefore phase noise continues to be a substantial problem.

Therefore both the direct conversion and superheterodyne architectures have shortcomings that limit device performance, size and expense.

SUMMARY

Embodiments of the invention may use independently variable RF and IF local oscillators in multistage receiver and transmitter circuits. The RF and IF local oscillator frequencies for a given RF channel may therefore be selected to have a large common factor with respect to the reference oscillator used by the local oscillator circuits, thus allowing the use of small divisor numbers in the local oscillator circuits and reducing phase noise.

Embodiments of the invention may also include both high-side and low-side RF local oscillators, and may selectively use a high-side or low-side local oscillator frequency depending on the RF channel to be transmitted or received. Each of the RF local oscillators has a relatively small duty range which enhances performance. The local oscillator signal ranges are also prevented from overlapping the RF band to be transmitted and received, which reduces oscillator signal leakage. This also allows the image bands to be located at significant distances from the RF band to be transmitted and received. As a result, the image rejection and filtering constraints of the circuits are relaxed, allowing the use of smaller, less expensive and less complex mixing and filtering elements.

DESCRIPTION OF THE DRAWINGS

FIG. 9 shows frequency configuration tables for the circuits of FIGS. 5, 6 and 8 in accordance with one embodiment of the invention.

DETAILED DESCRIPTION

Figure 1:
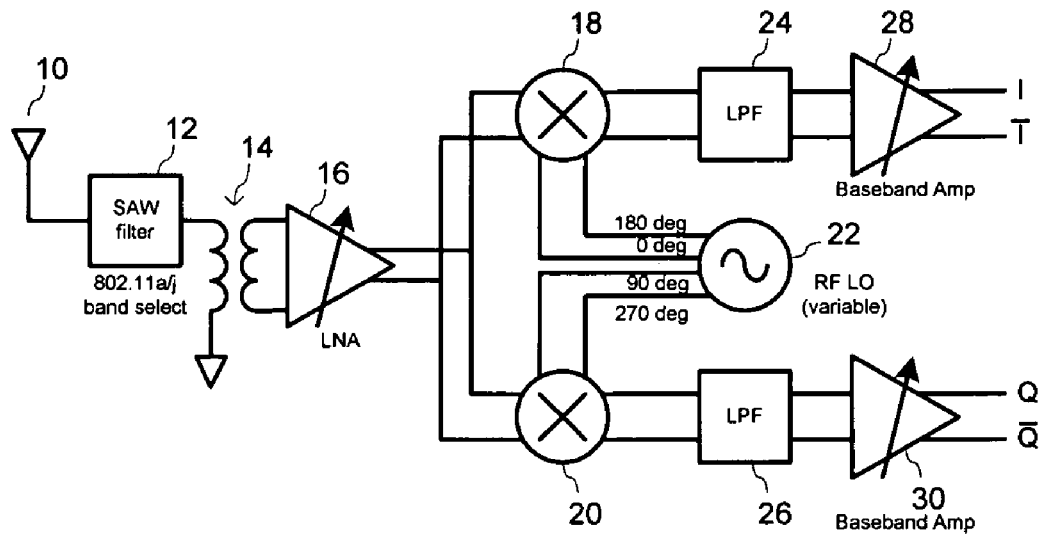
FIG. 1 shows an example of a conventional direct conversion receiver circuit.
Figure 2:
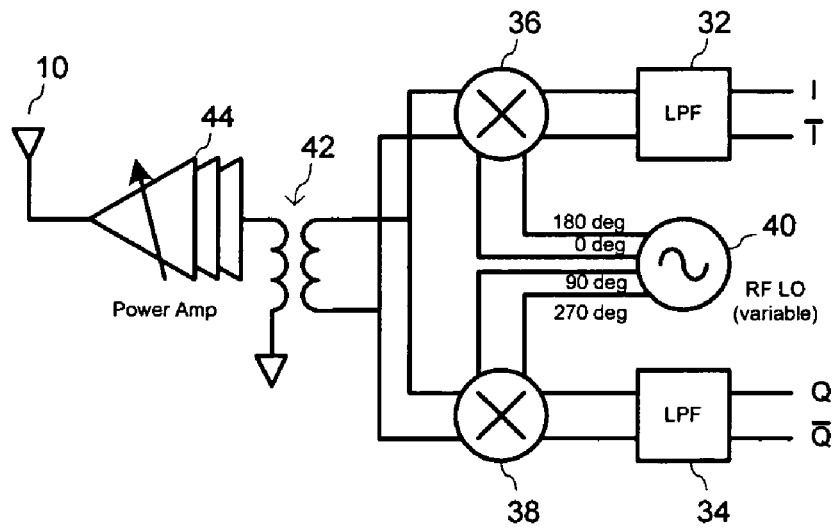
FIG. 2 shows an example of a conventional direct conversion transmitter circuit.
Figure 3:
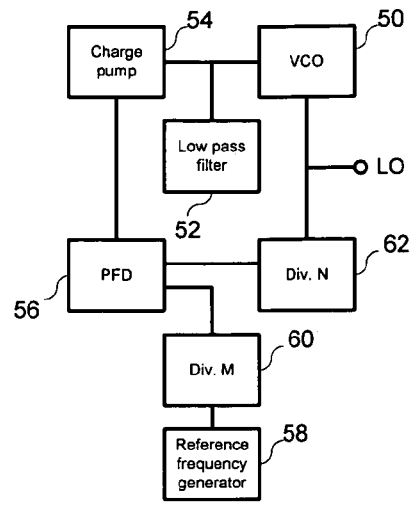
FIG. 3 shows an example of a conventional local oscillator circuit implemented as a phase locked loop.
Figure 4:
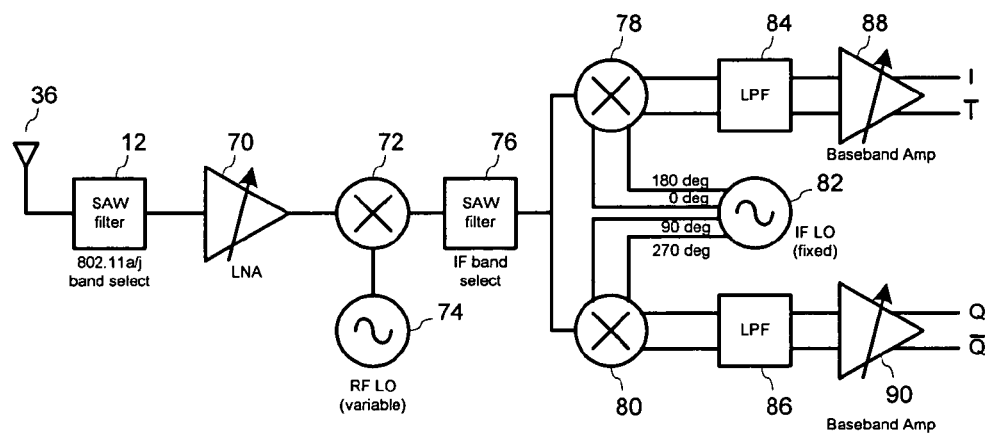
FIG. 4 shows an example of a conventional superheterodyne or multistage receiver circuit.
Figure 5:
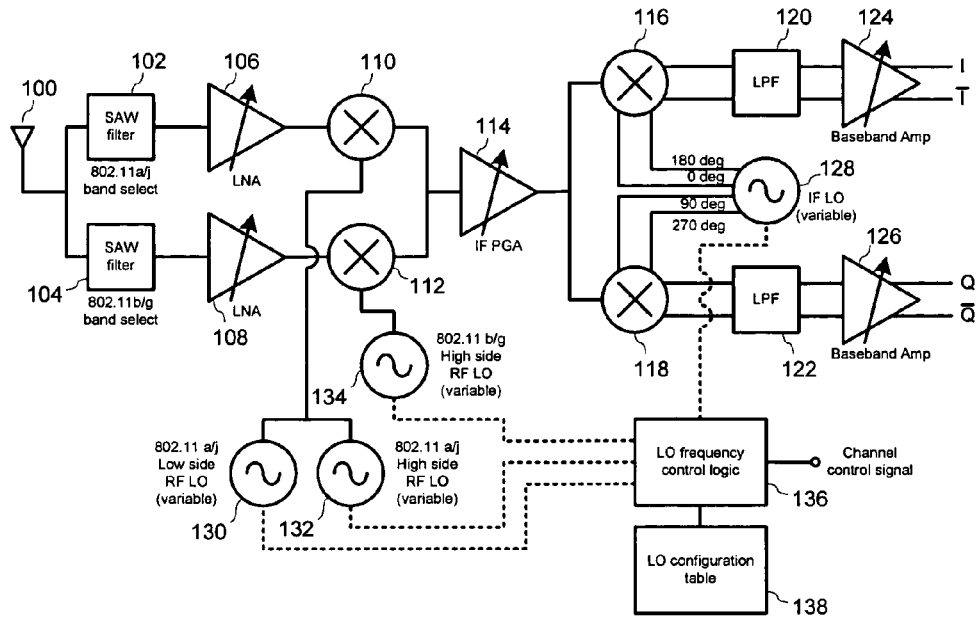
FIG. 5 shows a receiver circuit in accordance with one embodiment of the invention.
Figure 6:
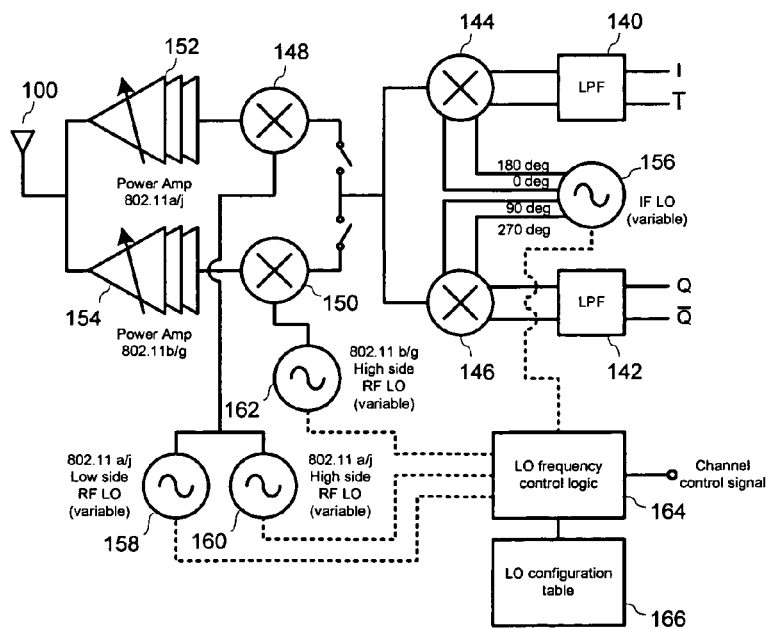
FIG. 6 shows a transmitter circuit in accordance with one embodiment of the invention.

FIG. 5 shows a receiver circuit in accordance with one embodiment of the invention, and FIG. 6 shows a corresponding transmitter circuit.

The receiver and transmitter circuits of FIGS. 5 and 6 are characterized by multistage down-conversion and up-conversion schemes that use independently variable RF and IF local oscillators. In the receiver circuit of FIG. 5, a variable frequency RF local oscillator is adjusted to down-convert a specific RF channel to a variable intermediate frequency. The intermediate frequency signal is then down-converted to baseband frequency using a variable frequency IF local oscillator. A complementary up-conversion process using variable IF and RF local oscillator frequencies is employed in the transmitter circuit of FIG. 6. By allowing the RF and IF local oscillator frequencies to be varied independently, the circuits can be configured to down-convert the RF channel using a combination of local oscillator frequencies that uses very small divisor numbers in the frequency synthesizer circuits, thus reducing the phase noise produced by the local oscillators.

The receiver and transmitter circuits of FIGS. 5 and 6 are also characterized by the ability to be adapted for use with any of the conventional reference oscillator frequencies such as 40 MHz, 44 MHz, 32 MHz and 24 MHz while maintaining low phase noise. Because the RF and IF local oscillators are independently variable, the RF and IF local oscillator frequencies for each RF channel may be selected so as to use divisors that take advantage of the largest possible common factors with the reference oscillator frequency.

The receiver and transmitter circuits of FIGS. 5 and 6 are further characterized by the selective use of high-side and low-side local oscillator frequencies depending on the frequency of the selected channel. In the receiver circuit of FIG. 5, a first RF local oscillator provides low-side local oscillator frequencies for channels of the 802.11j standard and channels in the lower bands of the 802.11a standard, while a second RF local oscillator provides high-side local oscillator frequencies for channels in the upper band of the 802.11a standard. This provides a number of advantages. It is not necessary for a single oscillator to cover the full range of frequencies within the 802.11 a/j standards, and the smaller duty ranges of the separate high-side and low-side oscillators reduces their noise and power consumption. The local oscillator signal ranges are also prevented from overlapping the RF band to be demodulated, which reduces oscillator signal leakage. Further, the image band for the 802.11j standard and the lower band of the 802.11a standard may be located in a portion of the RF spectrum that has relatively little native signal strength, while the image band for the upper band of the 802.11a standard may be located in a high frequency portion of the RF spectrum that is easily attenuated. As a result, the image rejection and filtering constraints of the receiver circuit are relaxed, allowing the use of smaller, less expensive and less complex mixing and filtering elements.

The receiver and transmitter circuits of FIGS. 5 and 6 are also characterized by the ability to down-convert and up-convert signals in multiple RF bands. In the receiver circuit of FIG. 5, channels in the 802.11 b/g band, the 802.11j band and the 802.11a band may be down-converted to intermediate frequencies and then to baseband using the same IF local oscillator and IF mixers. A complementary up-conversion process to channels in any of these bands is employed in the transmitter circuit of FIG. 6. The receiver and transmitter circuits of FIGS. 5 and 6 may be implemented in a single integrated circuit, thus providing a single-chip multi-standard transceiver serving the 802.11 a/j and 802.11 b/g standards. The channels available to the transmitter and receiver circuits are highly configurable by way of a configuration table that specifies local oscillator states and frequencies corresponding to available channels, offering virtually unlimited channel availability.

The receiver and transmitter circuits of FIGS. 5 and 6 are now examined in more detail. The receiver circuit of FIG. 5 includes respective SAW filters 102, 104 that select the 802.11 a/j bands and 802.11 b/g band from among signals received by an antenna 100. The signals from the SAW filters 102, 104 are provided to respective programmable gain low noise amplifiers 106, 108. Matching networks (not shown) are preferably coupled between the respective SAW filters and their corresponding low noise amplifiers to improve their rejection profiles. The amplifiers provide amplified RF signals to respective RF mixers 110, 112 where they are down-converted to intermediate frequencies. The RF mixers 110, 112 preferably have a band select profile and are internally switchable between operable and inoperable states. The RF mixers 110, 112 are preferably high linearity elements and may be implemented as LC-folded cascade mixers. The signals from the RF mixers 110, 112 are provided to a single ended intermediate frequency programmable gain amplifier 114. The IF amplifier 114 is preferably a high linearity amplifier that produces relatively little mixing of tones from adjacent channels. The IF amplifier 114 drives the inputs of respective IF mixers 116, 118 that down-convert the IF signals to differential in-phase and quadrature baseband signals. The differential baseband signals are filtered by respective low pass filters 120,122 to remove spurious tones from adjacent channels, and are then amplified by external baseband amplifiers 124, 126.

Both the RF mixers 110, 112 and the IF mixers 116, 118 of the receiver circuit of FIG. 5 receive variable frequency local oscillator signals. The IF mixers 116, 118 receive variable in-phase and quadrature signals from a variable IF local oscillator 128. The RF mixer 110 for the 802.11 a/j band receives a variable local oscillator signal from a low-side RF local oscillator 130 or from a high-side RF local oscillator 132, depending on the frequency of the selected RF channel. The RF mixer 112 for the 802.11 b/g band receives a variable local oscillator signal from a high-side RF local oscillator 134.

As discussed below with respect to FIG. 8, the three RF local oscillators shown in FIG. 5 need not be implemented as three separate frequency synthesizer circuits, but rather may be provided by a single frequency synthesizer circuit that is configurable in real time to produce variable frequencies within bands that are appropriate for high-side or low-side injection corresponding to the selected RF channel or signal band.

The frequencies produced by the RF local oscillators and the IF local oscillator are controlled by a local oscillator frequency control logic circuit 136. Connections between the control logic circuit 136 and the local oscillators are represented in FIG. 5 as broken lines to distinguish them from the signal carrying lines and local oscillator signal lines of the receiver circuit. The local oscillator frequency control logic circuit 136 selects the frequencies and states of the local oscillators in response to a channel control signal that represents the RF channel to be received by the receiver circuit. The local oscillator frequency control logic circuit 136 references a local oscillator configuration table 138 that stores information indicating the appropriate IF and RF local oscillator frequencies and states for receiving various RF channels.

Referring now to FIG. 6, the transmitter circuit of FIG. 6 has an architecture that is complementary to the receiver architecture of FIG. 5. In the transmitter circuit of FIG. 6, differential in-phase and quadrature baseband signals are filtered by respective low pass filters 140, 142 and provided to respective IF mixers 144, 146 where the signals are up-converted to a variable intermediate frequency by mixing with differential in-phase and quadrature signals from a variable frequency local oscillator 156. The outputs of the IF mixers 144, 146 are summed and selectively supplied to respective RF mixers 148,150 corresponding to the 802.11 a/j and 802.11 b/g standards, where the signals are up-converted to RF by mixing with signals from respective RF local oscillators 158, 160, 162. The RF mixers 148, 150 preferably have programmable gains. Respective power amplifiers 152, 154 amplify the RF signals and drive an antenna 100. The power amplifiers 152, 154 may be implemented as class-A power amplifiers. The LC tanks of the 802.11 a/j band power amplifier 152 may be tunable by MOS capacitors to switch from 4.9 GHz to 5.8 GHz to provide optimum power at the selected band.

The local oscillator signals received by the RF mixers 148, 150 and the IF mixers 144, 146 have variable frequencies. The IF mixers 144, 146 receive variable in-phase and quadrature signals from a variable IF local oscillator 156. The RF mixer 148 for the 802.11 a/j band receives a variable local oscillator signal from a low-side RF local oscillator 158 or from a high-side RF local oscillator 160. The RF mixer for the 802.11 b/g band receives a variable local oscillator signal from a high-side RF local oscillator 162.

The frequencies produced by the RF local oscillators and the IF local oscillator are controlled by a local oscillator frequency control logic circuit 164. Connections between the control logic circuit 164 and the local oscillators are represented in FIG. 6 as broken lines to distinguish them from the signal carrying lines and local oscillator signal lines of the transmitter circuit. The local oscillator frequency control logic circuit 164 selects the frequencies and states of the local oscillators in response to a channel control signal that represents the RF channel to be received by the receiver circuit. The local oscillator frequency control logic circuit 164 references a local oscillator configuration table 166 that stores information indicating the appropriate IF and RF local oscillator frequencies and states for transmitting various RF channels.

As discussed below with respect to FIG. 8, the three RF local oscillators of FIG. 6 need not be implemented as three separate frequency synthesizer circuits, but rather may be provided by a single frequency synthesizer circuit that is reconfigured as necessary to produce variable frequencies within bands that are appropriate for high-side or low-side injection corresponding to the selected RF signal band.

Further, although illustrated separately in FIGS. 5 and 6, the receiver and transmitter circuits preferably share the same local oscillators, local oscillator frequency control logic circuit and local oscillator configuration table.

Figure 7:
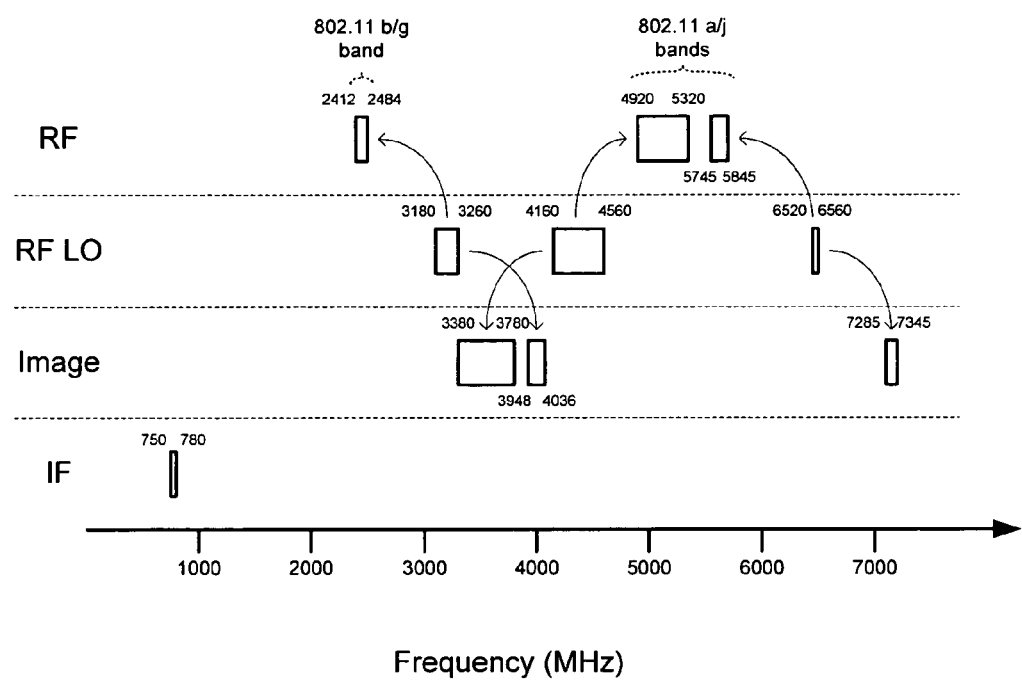
FIG. 7 shows a frequency plan for the circuits of FIGS. 5 and 6 in accordance with one embodiment of the invention.

Reference is now made to FIG. 7, which shows one example of a frequency plan for the receiver circuit of FIG. 5 and the transmitter circuit of FIG. 6. The frequency plan diagram of FIG. 7 shows the RF signal bands that are received and transmitted by the circuits, the RF local oscillator bands that are used to modulate and demodulate the RF signals, the intermediate frequency band corresponding to the RF and RF local oscillator bands, and the image bands corresponding to the RF and RF local oscillator bands. For purposes of this disclosure, the image is the frequency or band of frequencies that will produce a signal at approximately the same intermediate frequency as a given RF frequency when each is mixed with the same RF local oscillator frequency.

The frequency plan of FIG. 7 provides a common intermediate frequency band in the range of 750-780 MHz for both the 802.11 a/j and 802.11 b/g bands, and locates RF local oscillator frequencies for the 802.11 b/g band, the 802.11j band and the lower 802.11a band such that the images for these bands are located in the relatively quiet region of the RF spectrum from approximately 3 GHz to 4 GHz, which is occupied primarily by very low power satellite transmissions. As seen in FIG. 7, the 802.11 b/g band has channels in the range of 2412-2484 MHz, and for this band the frequency plan provides a high-side local oscillator band in the range of 3180-3260 MHz, resulting in an image band in the range of 3948-4036 MHz. The 802.11 a/j bands have channels in the ranges of 4920-5320 MHz and 5745-5845 MHz. For the 802.11j band and the lower 802.11a band, a low-side local oscillator in the range of 4160-4560 MHz is used, resulting in an image band in the range of 3380-3780 MHz. Because these image bands are relatively quiet, any native signals in these image bands that are received by the receiver will have relatively low amplitudes, and so the rejection and filtering requirements for the receiver circuit are relaxed, enabling the use of smaller and lower power components.

For the upper 802.11a band, a high-side local oscillator in the range of 6520-6560 MHz is used, resulting in an image band in the range of 7285-7345 MHz. Signals in this image band are highly attenuated at the front end of the receiver by the band selection provided by the band select filter and the input matching network, and by the band pass response of the front end low noise amplifier, and so this image band does not impose significant restrictions on the image rejection and filtering requirements of the mixers and the intermediate frequency amplifier of the circuit.

Figure 8:
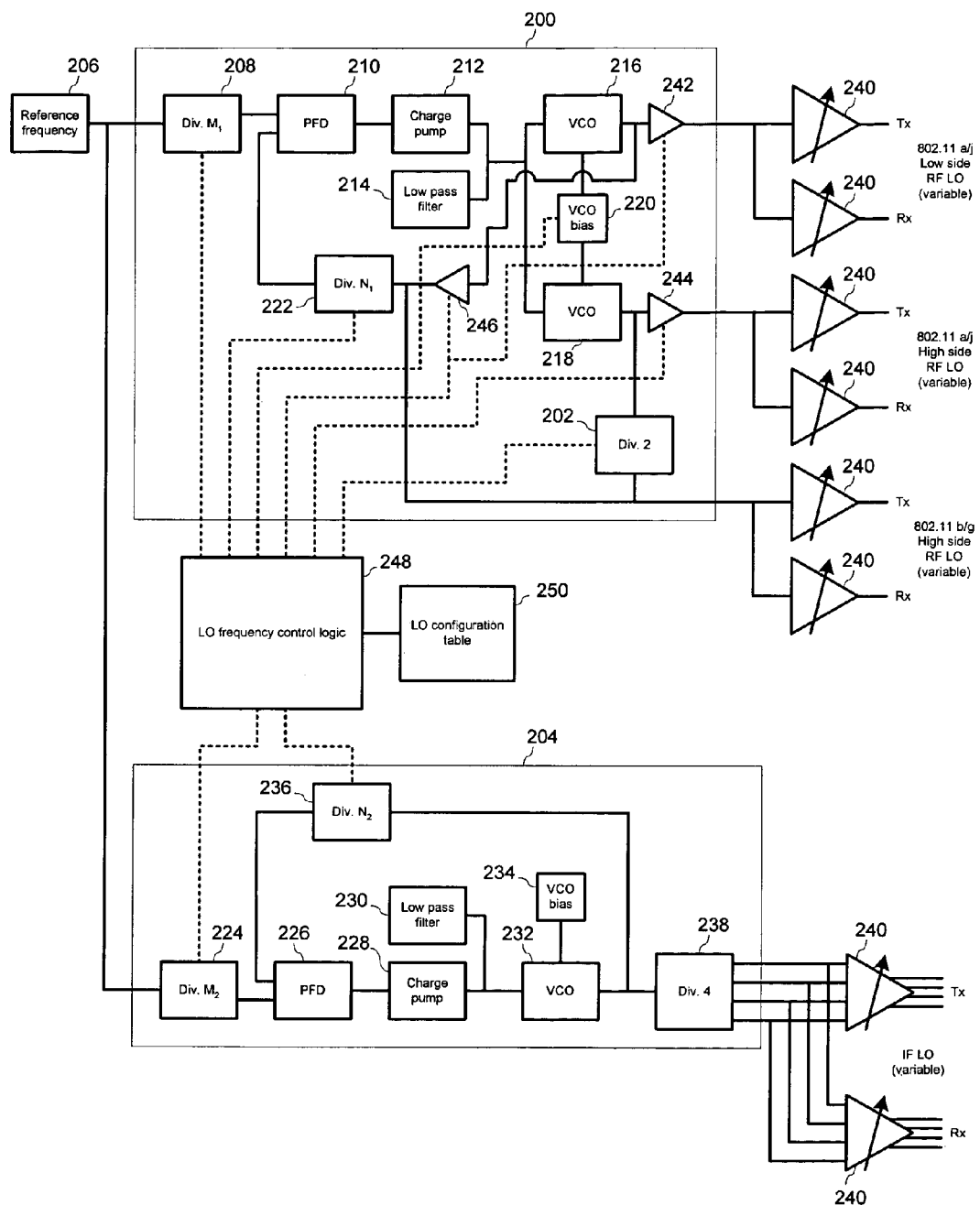
FIG. 8 shows one embodiment of the local oscillators of the circuits of FIGS. 5 and 6.

Reference is now made to FIG. 8, which shows one embodiment of a circuit for implementing the local oscillators of the receiver and transmitter circuits of FIGS. 5 and 6. At a high level, this circuit is comprised of a first frequency synthesizer 200 which is implemented as a phase locked loop having two separate voltage controlled oscillators for providing separate 802.11 a/j low-side and high-side RF local oscillator signals. A frequency divider 202 divides the 802.11 a/j high-side RF local oscillator frequency by two to provide a high-side RF local oscillator frequency for the 802.11 b/g band. A second frequency synthesizer 204 which is also implemented as a phase locked loop provides IF local oscillator signals.

Examining FIG. 8 in more detail, a reference frequency generator 206 provides a reference frequency for both of the frequency synthesizers 200, 204. The reference frequency generator 206 is typically a crystal oscillator. There are a number of standard crystal oscillator frequencies that are used in present generation RF devices, including 24 MHz, 32 MHz, 40 MHz and 44 MHz. The configurability of the local oscillator frequencies in the circuits disclosed herein allows the circuits to be adapted to use any of the well-known standard crystal oscillators by providing appropriate configuration information in the local oscillator configuration table.

The first frequency synthesizer 200 is comprised of a frequency divider 208 that receives the reference frequency and outputs a divided frequency to a phase frequency detector 210. A charge pump 212 receives a control signal from the phase frequency detector 210 and drives current into and out of a low pass filters 214. The charge in the low pass filters 214 serves as a control signal for separate voltage controlled oscillators 216 and 218 which are both biased by a commonly shared bias circuit 220. The first voltage controlled oscillator 216 produces a low-side RF local oscillator frequency for the lower 802.11 a/j band. The output of this oscillator 216 is provided directly to a frequency divider 222 that supplies a signal to the phase frequency detector 210 to complete the phase locked loop for the 802.11 a/j low-side RF local oscillator. The second voltage controlled oscillator 218 produces a high-side RF local oscillator frequency for the upper 802.11a band. The output of this oscillator 218 is supplied to a frequency divider 202 where the frequency is divided by two. The output of the frequency divider 202 provides a high-side RF local oscillator signal for the 802.11 b/g band. The output of this frequency divider 202 is also supplied to the main frequency divider 222, which supplies a signal to the phase frequency detector 210 to complete the phase locked loop for the 802.11a/j high-side RF local oscillator. Dividing the high frequency output of the second voltage controlled oscillator 218 by two before supplying it to the frequency divider 222 relaxes the bandwidth requirements of the programmable frequency divider 222.

The second frequency synthesizer 204 is comprised of a frequency divider 224 that receives the reference frequency and outputs a divided frequency to a phase frequency detector 226. A charge pump 228 receives a control signal from the phase frequency detector 226 and drives current into and out of a low pass filter 230. The charge in the low pass filter 230 serves as a control signal for a voltage controlled oscillator 232 that is biased by a bias circuit 234. The output of the voltage controlled oscillator 232 is provided to a frequency divider 236 that supplies a signal to the phase frequency detector 226 to complete the phase locked loop for the IF local oscillator. The output of the voltage controlled oscillator 232 is also provided to a frequency divider 238 that divides the output frequency of the voltage controlled oscillator 232 by four to produce differential in-phase and quadrature signals having a frequency that is one quarter of the frequency of the voltage controlled oscillator 232.

The local oscillator signals produced by the circuit of FIG. 8 are supplied to the respective mixers through separate transmitter and receive buffers 238. The buffers may have programmable gains.

During operation, the RF local oscillator frequencies and IF local oscillator frequencies produced by the circuit of FIG. 8 are determined by the divisor numbers that are set in the frequency dividers of the frequency synthesizer circuits 200, 204, and by the states of control elements within the frequency synthesizer circuits. In the RF frequency synthesizer 200, the output frequency is determined by the divisors $M_1$ and $N_1$ set in the frequency dividers 208 and 222, by the states of tri-state buffers 242, 244 that control the connections between the VCOs and their corresponding output buffers 240, by the state of a tri-state buffer 246 that controls the feedback of a signal from the 802.11 a/j low-side VCO 216 to the frequency divider 222, by the state of the frequency divider 202 that controls the feedback of the signal from the 802.11 a/j high-side VCO 218 to the frequency divider 222, and by the state of the shared VCO bias circuit 220. In the IF frequency synthesizer 204, the output frequency is determined by the divisors $M_2$ and $N_2$ set in the frequency dividers 224 and 236.

The aforementioned divisor numbers and element states are controlled by a local oscillator frequency control logic circuit 248 in response to a control signal that indicates the RF channel to be used by the receiver and transmitter. Examples of divisor numbers and corresponding VCO and local oscillator frequencies for the circuit of FIG. 8 are shown in the frequency configuration tables of FIG. 9. These tables assume the use of a 40 MHz crystal oscillator reference. The first table of FIG. 9 shows divisors and local oscillator frequencies for channels in the 802.11 b/g band and the following tables show divisors and local oscillator frequencies for channels in the 802.11j and 802.11a bands. As seen in the tables, the RF VCO is adjusted among frequencies that are multiples of 20 MHz. As a result, the 40 MHz reference frequency and the RF local oscillator frequencies have a common factor of 20 MHz, allowing relatively small divisor numbers to be used in the RF local oscillator frequency divider. The IF VCO frequencies for the 802.11 b/g bands are adjusted among frequencies that are multiples of 4 MHz, and so the 40 MHz reference frequency and the IF VCO frequencies have a common factor of 4 MHz. Although the divisor numbers used for the IF local oscillator are higher than the divisor numbers for the RF local oscillator, they are still significantly lower than the divisor numbers required by conventional circuits and result in significantly less phase noise. The IF VCO frequencies for the 802.11a and 802.11j bands are adjusted among frequencies that are multiples of 20 MHz, and so the 40 MHz reference frequency and the IF VCO frequencies have a common factor of 20 MHz, allowing very small divisor numbers to be used in the IF local oscillator for these bands.

The Tables of FIG. 9 illustrate a manner in which benefits may be realized through the use of variable RF and IF local oscillator frequencies. Because the intermediate frequency is variable, there is freedom to select combinations of RF and IF VCO frequencies for each channel that have the largest possible factors in common with the reference frequency, thus reducing the divisor numbers required to produce those frequencies. While the Tables of FIG. 9 are based on the use of a 40 MHz reference, appropriate frequencies and divisor numbers may be configured for using other references such as 44 MHz, 32 MHz and 24 MHz.

The local oscillator configuration table 250 of the circuit of FIG. 8 may include information such as the divisor numbers $M_1$, $N_1$, $M_2$ and $N_2$ of the tables of FIG. 9, along with state information for various elements within the frequency synthesizers. This information may, for example, be associated with an identifier relating each set of divisors and states to a particular RF channel. During operation, the local oscillator control logic circuit 248 reads divisor and state information from the table corresponding to an RF channel specified in a channel control signal received by the logic, circuit 248. The logic circuit 248 then sets the divisor values and element states of the frequency synthesizers 200, 204 in accordance with the information read from the table to cause the receiver and transmitter to receive and transmit the selected channel.

The local oscillator configuration table may be stored in a non-volatile memory unit or may be loaded into a memory element upon initialization of system control software that controls the transceiver circuit and other components in a device in which the transceiver circuit is implemented, such as a wireless LAN interface device.

While one embodiment of the invention uses a local oscillator configuration table as described above, other embodiments of the invention may eliminate the configuration table and simply supply configuration data bits directly to the local oscillator control logic circuit as a control signal representing frequency synthesizer divisor values and element states.

The circuits, devices, processes and features described herein are not exclusive of other circuits, devices, processes and features, and variations and additions may be implemented in accordance with the particular objectives to be achieved. For example, circuits as described herein may be integrated with other circuits not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

What is claimed is:

1. A receiver circuit for down-converting a radio frequency (RF) signal, comprising:
   an RF mixer that down-converts an RF signal to an intermediate frequency (IF) signal;
   a first variable frequency RF local oscillator that supplies a first RF local oscillator frequency to the RF mixer;
   an IF mixer that down-converts the IF signal to a baseband signal;
   a variable frequency IF local oscillator that supplies an IF local oscillator frequency to the IF mixer, the IF local oscillator frequency being variable independently of variations of the first RF local oscillator frequency;
   a local oscillator control circuit that sets the first RF local oscillator frequency and the IF local oscillator frequency in accordance with an RF channel to be down-converted; and
   a second variable frequency RF local oscillator that supplies a second RF local oscillator frequency to the RF mixer;
   wherein the IF local oscillator frequency is variable independent of variations of the second RF local oscillator frequency; and
   wherein the local oscillator control circuit selectively controls the first variable frequency RF local oscillator and second variable frequency RF local oscillator to supply low-side RF local oscillator frequencies to the RF mixer from the first variable frequency RF local oscillator or to supply high-side RF local oscillator frequencies to the RF mixer from the second variable frequency RF local oscillator.

2. The circuit claimed in claim 1, further comprising a local oscillator configuration table referenced by the local oscillator control circuit to set the first RF local oscillator frequency and IF local oscillator frequency, the configuration table storing data indicating RF local oscillator configurations and IF local oscillator configurations corresponding to respective RF channels.

3. The circuit claimed in claim 1, wherein the local oscillator control circuit selectively controls the first variable frequency RF local oscillator and the second variable frequency RF local oscillator to supply a low-side local oscillator signal or a high-side local oscillator signal to the RF mixer in accordance with an RF channel to be down-converted.

4. The circuit claimed in claim 3, wherein the local oscillator control circuit controls the first variable frequency RF local oscillator and the second variable frequency RF local oscillator to supply a low-side local oscillator signal for down-converting channels of the 802.11a standard from 5.18 GHz to 5.32 GHz and to supply a high-side local oscillator signal for down-converting channels of the 802.11a standard from 5.745 GHz to 5.805 GHz.

5. The circuit claimed in claim 1, wherein the first variably frequency RF local oscillator and the second variable frequency RF local oscillator are implemented as a phase locked loop comprising a first voltage controlled oscillator that produces the first RF local oscillator frequency and a second voltage controlled oscillator that produces the second RF local oscillator frequency.

6. An integrated circuit chip embodying the receiver circuit of claim 1.

7. An RF communication device embodying the receiver circuit of claim 1.

8. A transmitter circuit for producing a radio frequency (RF) signal, comprising:
   an IF mixer that up-converts a baseband signal to an intermediate frequency (IF) signal;
   a variable frequency IF local oscillator that supplies an IF local oscillator frequency to the IF mixer;
   an RF mixer that up-converts the intermediate frequency (IF) signal to an RF signal;
   a first variable frequency RF local oscillator that supplies a first RF local oscillator frequency to the RF mixer, the IF local oscillator frequency being variable independently of variations of the first RE local oscillator frequency;
   a local oscillator control circuit that sets the first RF local oscillator frequency and the IF local oscillator frequency in accordance with an RF channel to be transmitted; and
   a second variable frequency RF local oscillator that supplies a second RF local oscillator frequency to the RF mixer;
   wherein the IF local oscillator is variable independent of variations of the second RF local oscillator frequency; and
   wherein the local oscillator control circuit selectively controls the first variable frequency RF local oscillator and second variable frequency RF local oscillator to supply low-side RF local oscillator frequencies to the RF mixer from the first variable frequency RF local oscillator or to supply high-side RF local oscillator frequencies to the RF mixer from the second variable frequency RF local oscillator.

9. The circuit claimed in claim 8, further comprising a local oscillator configuration table referenced by the local oscillator control circuit to set the first RF local oscillator frequency and IF local oscillator frequency, the configuration table storing data indicating RF local oscillator configurations and IF local oscillator configurations corresponding to respective RF channels.

10. The circuit claimed in claim 8, wherein the local oscillator control circuit selectively controls the first variable frequency RF local oscillator and the second variable frequency RF local oscillator to supply a low-side local oscillator signal or a high-side local oscillator signal to the RF mixer in accordance with an RF channel to be transmitted.

11. The circuit claimed in claim 10, wherein the local oscillator control circuit controls the first variable frequency RF local oscillator and the second variable frequency RF local oscillator to supply a low-side local oscillator signal for up-converting to channels of the 802.11a standard from 5.18 GHz to 5.32 GHz and to supply a high-side local oscillator signal for up-converting to channels of the 802.11a standard from 5.745 GHz to 5.805 GHz.

12. The circuit claimed in claim 8, wherein the first variable frequency RF local oscillator and the second variable frequency RF local oscillator are implemented as a phase locked loop comprising a first voltage controlled oscillator that produces the first RF local oscillator frequency and a second voltage controlled oscillator that produces the second RF local oscillator frequency.

13. An integrated circuit chip embodying the transmitter circuit of claim 8.

14. An RF communication device embodying the transmitter circuit of claim 8.

15. A transceiver circuit for radio frequency (RF) communications, compromising:
    an RF receiver mixer that down-converts an RF received signal to an intermediate frequency (IF) received signal;
    an IF receiver mixer that down-converts the IF received signal to a baseband received signal;
    an IF transmit mixer that up-converts a baseband transmit signal to an IF transmit signal;
    an RF transmit mixer that up-converts the IF transmit signal to an RF transmit signal;
    a first variable frequency RF local oscillator that supplies a first RF local oscillator frequency to the RF receiver mixer and the RF transmit mixer;
    a variable frequency IF local oscillator that supplies an IF focal oscillator frequency to the IF receiver mixer and the IF transmit mixer, the IF local oscillator frequency being variable independently of variations of the first RF local oscillator frequency;
    a local oscillator control circuit that sets the first RF local oscillator frequency and the IF local oscillator frequency in accordance with an RF channel to be transmitted and received; and
    a second variable frequency RF local oscillator that supplies a second RF local oscillator frequency to the RF receiver mixer and the RF transmit mixer;
    wherein the IF local oscillator frequency is variable independent of variations of the second RF local oscillator frequency; and
    wherein the local oscillator control circuit selectively controls the first variable frequency RF local oscillator and second variable frequency RF local oscillator to supply low-side RF local oscillator frequencies to the RF receiver mixer and the RF transmit mixer from the first variable frequency RF local oscillator or to supply high-side RF local oscillator frequencies to the RF receiver mixer and the RF transmit mixer from the second variable frequency RF local oscillator.

16. The circuit claimed in claim 15, further comprising a local oscillator configuration table referenced by the local oscillator control circuit to set the first RF local oscillator frequency and IF local oscillator frequency, the configuration table storing data indicating RF local oscillator configurations and IF local oscillator configurations corresponding to respective RF channels.

17. The circuit claimed in claim 15, wherein the local oscillator control circuit selectively controls the first variable frequency RF local oscillator and the second variable frequency RF local oscillator to supply a low-side local oscillator signal or a high-side local oscillator signal to the RF receiver mixer and the RF transmit mixer in accordance with an RF channel to be transmitted and received.

18. The circuit claimed in claim 17, wherein the local oscillator control circuit controls the first variable frequency RF local oscillator and the second variable frequency RF local oscillator to supply a low-side local oscillator signal for transmitting and receiving channels of the 802.11a standard in the range of 5.18 GHz to 5.32 GHz and to supply a high-side local oscillator signal for transmitting and receiving channels of the 802.11a standard in the range of 5.745 GHz to 5.805 GHz.

19. The circuit claimed in claim 15, wherein the first variable frequency RF local oscillator and the second variable frequency RF local oscillator are implemented as a phase locked loop comprising a first voltage controlled oscillator producing the first RF local oscillator frequency and a second voltage controlled oscillator producing the second RF local oscillator signal frequency.

20. An integrated circuit chip embodying the transceiver circuit of claim 15.

21. An RF communication device embodying the transceiver circuit of claim 15.

* * * * *